(12) United States Patent
Mutsuo

(10) Patent No.: US 11,102,378 B2
(45) Date of Patent: Aug. 24, 2021

(54) IMAGE PROCESSING APPARATUS AND IMAGE FORMING APPARATUS PROVIDING CLUSTERING AND GRADATION PRESERVATION WITH REDUCED MEMORY REQUIREMENT

(71) Applicant: KYOCERA Document Solutions Inc., Osaka (JP)

(72) Inventor: Toshiaki Mutsuo, Osaka (JP)

(73) Assignee: Kyocera Document Solutions, Inc.

( * ) Notice: Subject to any disclaimer, the term of this patent is extended or adjusted under 35 U.S.C. 154(b) by 0 days.

(21) Appl. No.: 16/927,336

(22) Filed: Jul. 13, 2020

(65) Prior Publication Data
US 2021/0021731 A1    Jan. 21, 2021

(30) Foreign Application Priority Data
Jul. 18, 2019   (JP) .............................. JP2019-133182

(51) Int. Cl.
*H04N 1/40* (2006.01)
*H04N 1/405* (2006.01)
*H04N 1/407* (2006.01)
*G06T 5/20* (2006.01)

(52) U.S. Cl.
CPC .......... *H04N 1/4055* (2013.01); *H04N 1/407* (2013.01); *H04N 1/4052* (2013.01); *G06T 5/20* (2013.01)

(58) Field of Classification Search
USPC .............................................. 358/3.03, 3.01
See application file for complete search history.

(56) References Cited

U.S. PATENT DOCUMENTS

| | | | |
|---|---|---|---|
| 8,576,447 B2* | 11/2013 | Damera-Venkata | ........................ H04N 1/4052 358/3.03 |
| 9,729,757 B2* | 8/2017 | Mutsuo | ................ H04N 1/4052 |

FOREIGN PATENT DOCUMENTS

JP    2017-046275    3/2017

* cited by examiner

*Primary Examiner* — Barbara D Reinier

(57) ABSTRACT

An image processing apparatus generates and outputs a binarized output pixel value corresponding to an input pixel value; and includes a filter processing unit, a quantizer, and a buffer. The quantizer is configured to quantize a pixel value after a filter process performed by the filter processing unit and thereby generate the output pixel value. The buffer is configured to store for each pixel a difference between (a) a sum of the pixel value after the filter process and the input pixel value and (b) the output pixel value. Further, the filter processing unit performs a bandpass filter process on the basis of the difference stored by the buffer.

5 Claims, 4 Drawing Sheets

FIG. 3

$$\text{DoG}(x,y) = exp\left(-\frac{x^2+y^2}{4\sigma^2}\right) - exp\left(-\frac{x^2+y^2}{2\sigma^2}\right)$$

$$\text{Gain}(x,y) = \sqrt{Vx \times Vx + Vy \times Vy}$$

$$Vx = \alpha \times cos\left(tan^{-1}\left(\frac{x}{y}\right)\right)$$

$$Vy = cos\left(tan^{-1}\left(\frac{y}{x}\right)\right)$$

$$\text{Coefficient}(x,y) = Norm(\text{DoG}(x,y) \times \text{Gain}(x,y))$$

IMAGE PROCESSING APPARATUS AND IMAGE FORMING APPARATUS PROVIDING CLUSTERING AND GRADATION PRESERVATION WITH REDUCED MEMORY REQUIREMENT

CROSS-REFERENCE TO RELATED APPLICATIONS

This application relates to and claims priority rights from Japanese Patent Application No. 2019-133182, filed on Jul. 18, 2019, the entire disclosures of which are hereby incorporated by reference herein.

BACKGROUND

1. Field of the Present Disclosure

The present disclosure relates to an image processing apparatus and an image forming apparatus.

2. Description of the Related Art

When binarizing an input pixel value, an image processing apparatus performs quantization (i.e. binarization) with error diffusion of a value obtained by subtracting (a) a value obtained by applying a spatial bandpass filter to an output pixel value from (b) a value obtained by applying a spatial lowpass filter to the input pixel value. Consequently, output dots after the binarization are clustered with a cluster size (i.e. a condensing degree of output dots) corresponding to a filter characteristic of the bandpass filter.

Clustering the output dots gains granularity in some images to be outputted. Therefore, in order to restrain the granularity in a color output image, an image processing apparatus (a) performs a bandpass filter process for differences between output pixel values and input pixel values of adjacent pixels to a target pixel, (b) performs an error diffusion process of a quantization error for an output of this filter process, and (c) performs quantization for a value obtained by the error diffusion process; and thereby determines an output pixel value of the target pixel. In this filter process, the bandpass filter process is performed with different characteristics in a primary scanning direction and in a secondary scanning direction and with different characteristics in component colors of the image, and in order to restrain banding, a filter coefficient in the bandpass filter process is corrected with a correction coefficient corresponding to an angle to the primary scanning direction for each of the component colors.

However, the aforementioned image processing apparatus requires (a) a buffer for storing quantization errors in the error diffusion process and (b) a buffer for storing the differences between the output pixel values and the input pixel values in the filter process, and therefore a relatively large memory area is required for these two buffers.

SUMMARY

An image processing apparatus according to an aspect of the present disclosure is an image processing apparatus that generates and outputs a binarized output pixel value corresponding to an input pixel value; and includes a filter processing unit, a quantizer, and a buffer. The quantizer is configured to quantize a pixel value after a filter process performed by the filter processing unit and thereby generate the output pixel value. The buffer is configured to store for each pixel a difference between (a) a sum of the pixel value after the filter process and the input pixel value and (b) the output pixel value. Further, the filter processing unit performs a bandpass filter process on the basis of the difference stored by the buffer.

These and other objects, features and advantages of the present disclosure will become more apparent upon reading of the following detailed description along with the accompanied drawings.

BRIEF DESCRIPTION OF THE DRAWINGS

FIG. 3 shows a diagram that explains a filter coefficient used in the filter processing unit 1 of the image processing apparatus shown in FIG. 1.

DETAILED DESCRIPTION

Hereinafter, embodiments according to an aspect of the present disclosure will be explained with reference to drawings.

Embodiment 1

Figure 1:
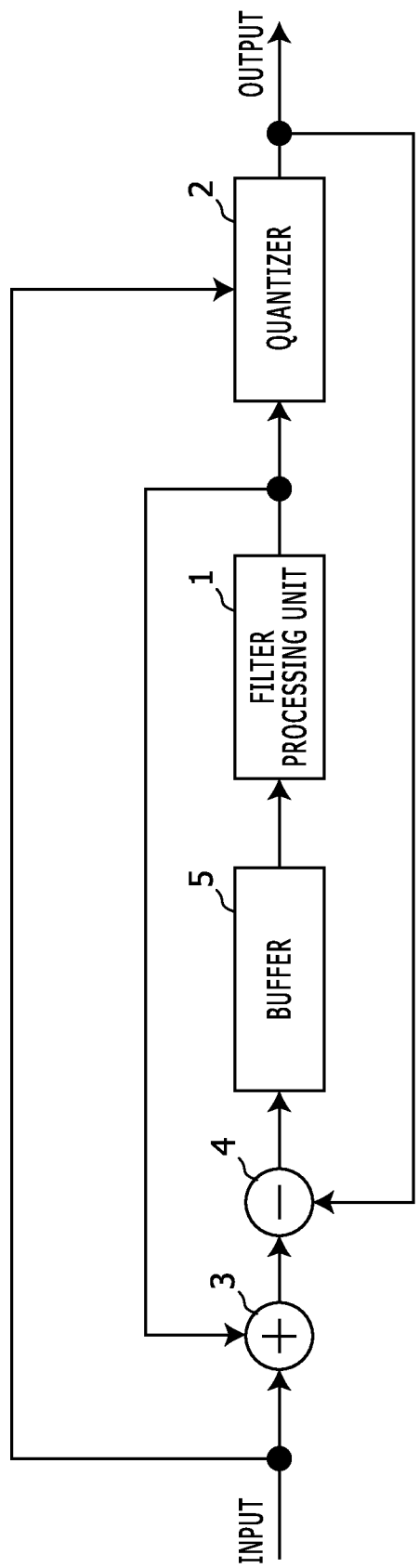
FIG. 1 shows a block diagram that indicates a configuration of an image processing apparatus according to Embodiment 1 of the present disclose.

FIG. 1 shows a block diagram that indicates a configuration of an image processing apparatus according to Embodiment 1 of the present disclose. The image processing apparatus shown in FIG. 1 generates and outputs a binarized output pixel value corresponding to an input pixel value, and for example, is included in an image forming apparatus such as a printer, a copier, or a multi function peripheral, which includes a printing device that outputs an image having the output pixel value. This image processing apparatus is configured with a computer, ASIC (Application Specific Integrated Circuit), and/or the like. The input pixel value is a value corresponding to one of multi gradation levels such as an 8-bit value, and takes any value in a range from 0 to 1. The output pixel value takes any one of 0 and 1.

The image processing apparatus includes a filter processing unit 1, a quantizer 2, an adder 3, a subtractor 4, and a buffer 5. To this image processing apparatus, the input pixel value of a target pixel is inputted sequentially along a predetermined scanning order.

The filter processing unit 1 performs a bandpass filter process on the basis of differences (mentioned below) stored by and in the buffer 5. Specifically, the filter processing unit 1 performs an operation for sum of products between the aforementioned differences of adjacent pixels to a target pixel and filter coefficients.

The quantizer 2 quantizes a pixel value after a filter process performed by the filter processing unit 1 and thereby generates the output pixel value. Here, a threshold value is set as 0, and in accordance with the threshold value, if an output of the filter processing unit 1 is equal to or larger than 0, then the output pixel value is set as 1, and otherwise if not, then the output pixel value is set as 0. If the input pixel value of the target pixel is 0 or 1, then the quantizer 2 sets the output pixel value of the target pixel as 0 or 1, that is, such that the output pixel value is set to be equal to the input pixel value.

The adder 3 calculates a sum of two pixel values: the input pixel value of the target pixel and the pixel value processed by the filter processing unit 1.

The subtractor 4 calculates for the target pixel a difference between a value of the calculation result by the adder 3 and the output pixel value. This difference is calculated after the binarized output pixel value (0 or 1 as a one-bit value) is converted to one of multi-gradation values (0 or 1 as a multi-bit value).

The buffer 5 includes a memory area, for example, of a memory such as SRAM (Static Random Access Memory) or DRAM (Dynamic Random Access Memory), and sequentially stores a value of the calculation result by the subtractor 4 for a target pixel into the memory area. Thus, for each pixel, the buffer 5 stores a difference between (a) a sum of the pixel value after the filter process by the filter processing unit 1 and the input pixel value and (b) the output pixel value.

Specifically, the buffer 5 stores the difference corresponding to the output pixel value already generated in the aforementioned predetermined scanning order, and the filter processing unit 1 performs the bandpass filter process for a target pixel on the basis of the difference already stored by the buffer 5 at a time point that the bandpass filter process is performed for this target pixel.

Figure 2:
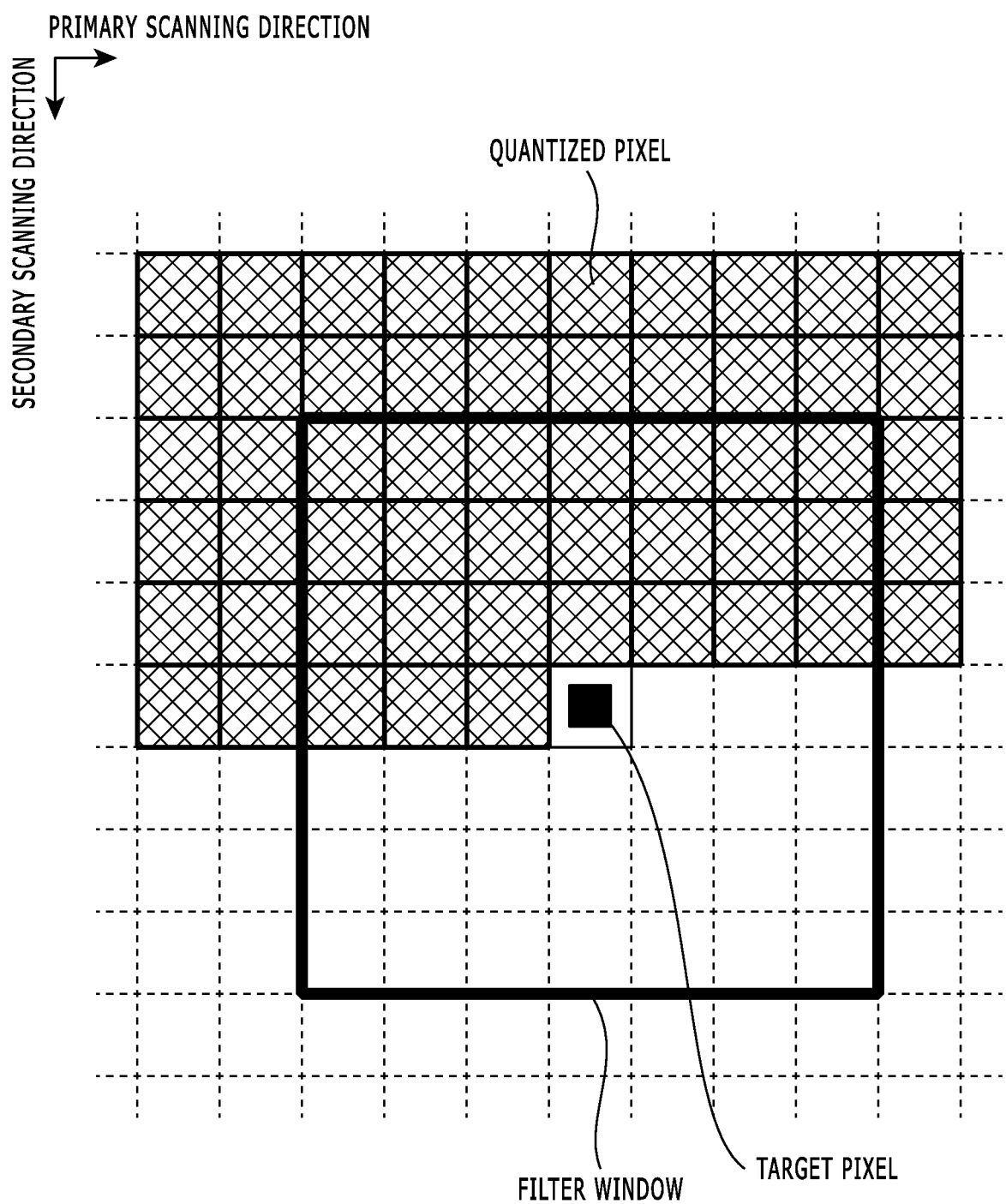
FIG. 2 shows a diagram that explains a pixel that the filter processing unit 1 shown in FIG. 1 refers to for filter calculation of a target pixel.

FIG. 2 shows a diagram that explains a pixel that the filter processing unit 1 shown in FIG. 1 refers to for filter calculation of a target pixel.

Here the target pixel is selected so as to move along the primary scanning direction and the secondary scanning direction (or meandering scanning) and therefore the calculation of the output pixel value has not been performed for a subsequent pixel after the current target pixel. Therefore, as shown in FIG. 2, the filter processing unit 1 performs the operation for sum of products between the aforementioned differences that have been derived and the filter coefficients, within the adjacent pixels to the target pixel. In other words, with considering the difference on the subsequent pixel as zero, the operation for sum of products is performed between the aforementioned differences and the filter coefficients.

In Embodiment 1, this bandpass filter process has a bandpass characteristic obtained by a difference between two Gaussian functions, that is, a DoG (Difference of Gaussian) filter process.

Further, in Embodiment 1, filter coefficients in the bandpass filter process are products of (a) the difference between two Gaussian functions and (b) correction coefficients, and the correction coefficients have different distributions in a primary scanning direction and in a secondary scanning direction.

In this bandpass filter process, the operation for sum of products is performed between the aforementioned differences and a filter coefficient matrix in a filter window having a predetermined size.

FIG. 3 shows a diagram that explains a filter coefficient used in the filter processing unit 1 of the image processing apparatus shown in FIG. 1.

In this embodiment, the filter coefficient "Coefficient (x, y)" of the bandpass filter process is obtained by normalizing a product of (a) the filter coefficient "DoG (x, y)" of a DoG filter as a difference between the aforementioned two Gaussian functions and (b) the correction coefficient "Gain (x, y)". Here, "x" and "y" indicate distances (the number of pixels) from a center of the filter matrix (i.e. a target pixel) in the primary scanning direction (i.e. x direction) and in the secondary scanning direction (i.e. y direction), respectively.

The filter coefficient DoG (x, y) of the DoG filter has a value calculated by a formula shown in FIG. 3, for example.

Further, the correction coefficient Gain (x, y) has a value calculated by a formula shown in FIG. 3, for example.

A constant "α" is an adjustment coefficient that takes a value larger than 0 and less than 1. Vx is a norm of a correction coefficient vector in the primary scanning direction, Vy is a norm of a correction coefficient vector in the secondary scanning direction, and the correction coefficient Gain (x, y) is a norm of a vector obtained by vector synthesis of the correction coefficient vectors in the primary and secondary scanning directions. It should be noted that if y=0 then Vx is set as 0 and if x=0 then Vy is set as 0.

As mentioned, gain distributions of the DoG filter is adjusted such that the gain distributions in the primary and secondary scanning directions get different from each other.

The following part explains a behavior of the image processing apparatus in Embodiment 1.

For a color plane of each component color in one image, this image processing apparatus selects a target pixel in turn along a predetermined scanning pattern, and derives an output pixel value of the target pixel in turn.

In this process, for a target pixel, an output pixel value is derived and outputted by the filter processing unit 1 and the quantizer 2 on the basis of the aforementioned differences already derived and stored by the buffer 5, and the aforementioned difference is calculated for the target pixel by the adder 3 and the subtractor 4 and stored by and in the buffer 5.

A value to be stored by and in the buffer 5 is a value obtained by adding the input pixel value to a difference between an input value and an output value of the quantizer (i.e. a quantization error), and therefore, the filter processing unit 1 substantially performs both the filter calculation for the input pixel value and the filter calculation for the quantization error, and thereby a sum of results of the both filter calculation is outputted from the filter processing unit 1.

In other words, the filter processing unit 1 as only one filter processing unit performs at once both a filter process for input pixel values of the adjacent pixels and a filter process for quantization errors of the adjacent pixels, and thereby the former realizes clustering output dots and the latter realizes gradation preservation through the quantization (corresponding to the error diffusion).

In the aforementioned manner, for all component colors (e.g. CMYK), after obtaining binary images that has the aforementioned output pixel value, these binary images are developed with toner of respective colors, and subsequently outputted as a color output image.

As mentioned, in Embodiment 1, the quantizer 2 quantizes a pixel value after a filter process performed by the filter processing unit 1 and thereby generates the output pixel value. The buffer 5 stores for each pixel a difference between (a) a sum of the pixel value after the filter process by the filter processing unit 1 and the input pixel value and (b) the output pixel value. Further, the filter processing unit 1 performs a bandpass filter process on the basis of the aforementioned differences stored by and in the buffer 5.

Consequently, clustering output dots is realized with a relatively small memory area. Specifically, as mentioned, only the buffer 5 (as only one buffer) keeps values of the past target pixels, and therefore, an only relatively small memory area is required for the apparatus; and in addition, performing the filter process one time accomplishes the clustering and the gradation preservation, and therefore, a data calculation amount and a circuit scale are restrained.

Embodiment 2

Figure 4:
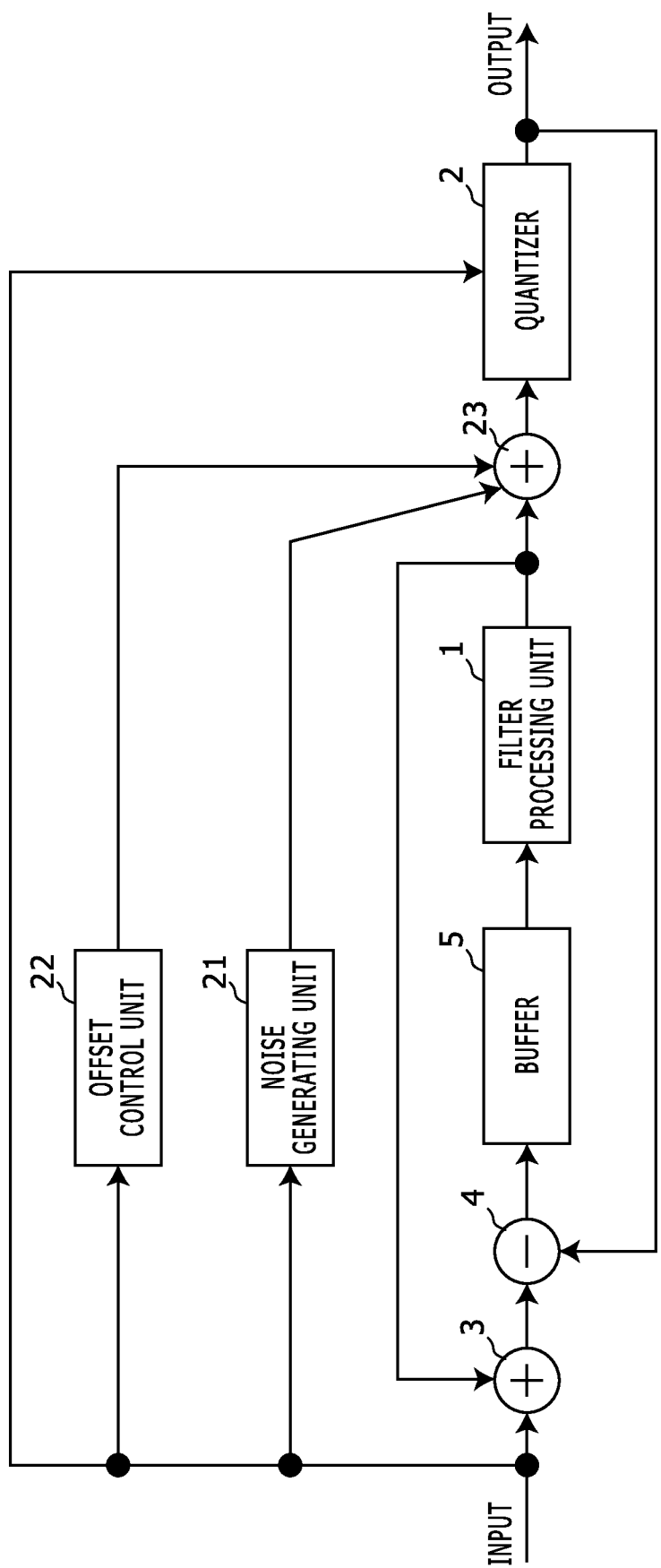
FIG. 4 shows a block diagram that indicates a configuration of an image processing apparatus according to Embodiment 2 of the present disclose.

FIG. 4 shows a block diagram that indicates a configuration of an image processing apparatus according to Embodiment 2 of the present disclose. As shown in FIG. 4, the image processing apparatus in Embodiment 2 includes a noise generating unit 21, an offset control unit 22, and an adder 23, additionally to the image processing apparatus in Embodiment 1.

The noise generating unit 21 generates a pseudorandom number, for example, using a pseudorandom number generator, and generates a predetermined noise on the basis of the pseudorandom number. For example, the noise generating unit 21 makes an amplitude of the noise smaller for a higher density of the target pixel. Consequently, banding on an intermediate gradation area is restrained in the image.

The offset control unit 22 generates a predetermined offset value in accordance with an input pixel value of the target pixel such that adding the offset value to the aforementioned noise restrains unintended creation of a dot.

For example, if the input pixel value of the target pixel is in a predetermined range adjacent to the smallest value (i.e. 0 of 256 gradation levels), then the offset control unit 22 sets the offset value as a negative value; and if the input pixel value of the target pixel is in a predetermined range adjacent to the largest value of 256 gradation levels (255 of 256 gradation levels), then the offset control unit 22 sets the offset value as a positive value. For example, the offset control unit 22 determines the offset value using a lookup table that outputs an offset value corresponding to an input pixel value of the target pixel.

The adder 23 adds the aforementioned noise and the aforementioned offset value to the output value of the filter processing unit 1.

Other parts of the configuration and behaviors of the image processing apparatus in Embodiment 2 are identical or similar to those in Embodiment 1, and therefore not explained here.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image processing apparatus that generates and outputs a binarized output pixel value corresponding to an input pixel value, comprising:
    a filter processing unit;
    a quantizer configured to quantize a pixel value after a filter process performed by the filter processing unit and thereby generate the output pixel value; and
    a buffer configured to store for each pixel a difference between (a) a sum of the pixel value after the filter process and the input pixel value and (b) the output pixel value;
    wherein the filter processing unit performs a bandpass filter process on the basis of the difference stored by the buffer.

2. The image processing apparatus according to claim 1, wherein the input pixel value is sequentially inputted along a predetermined scanning order;
    the buffer stores the difference corresponding to the output pixel value already generated in the predetermined scanning order; and
    the filter processing unit performs the bandpass filter process for a target pixel on the basis of the difference already stored by the buffer at a time point that the bandpass filter process is performed for this target pixel.

3. The image processing apparatus according to claim 1, wherein the bandpass filter process has a bandpass characteristic obtained by a difference between two Gaussian functions.

4. The image processing apparatus according to claim 3, wherein filter coefficients in the bandpass filter process are products of (a) the difference between two Gaussian functions and (b) correction coefficients; and
    the correction coefficients have different distributions in a primary scanning direction and in a secondary scanning direction.

5. An image forming apparatus, comprising:
    an image processing apparatus configured to generate and output a binarized output pixel value corresponding to an input pixel value;
    wherein the image processing apparatus comprises:
    a filter processing unit;
    a quantizer configured to quantize a pixel value after a filter process performed by the filter processing unit and thereby generate the output pixel value; and
    a buffer configured to store for each pixel a difference between (a) a sum of the pixel value after the filter process and the input pixel value and (b) the output pixel value;
        wherein the filter processing unit performs a bandpass filter process on the basis of the difference stored by the buffer.

* * * * *